United States Patent [19]

Akashi et al.

[11] 3,791,608

[45] Feb. 12, 1974

[54] FRICTION SHEET FOR A MAGNETIC TAPE RECORDING CASSETTE

[76] Inventors: Goro Akashi; Takashi Hirakawa, both of Kanagawa, Japan

[22] Filed: Sept. 10, 1970

[21] Appl. No.: 71,127

[30] Foreign Application Priority Data

Sept. 10, 1969 Japan .............................. 44-71885

[52] U.S. Cl. .................... 242/199, 117/68, 117/226, 117/227, 204/22

[51] Int. Cl. .......................................... G11b 23/04

[58] Field of Search .. 117/68, 226, 227; 204/20, 22; 242/55.19 A, 199, 200

[56] References Cited

UNITED STATES PATENTS

| | | | |
|---|---|---|---|
| 3,502,284 | 3/1970 | Loewenberg et al. | 242/199 |
| 3,556,433 | 1/1971 | Abitboul | 242/210 X |
| 3,556,434 | 1/1971 | Koeppe | 242/199 |
| 3,529,788 | 9/1970 | Sasalci et al. | 242/199 |
| 2,778,636 | 1/1957 | Eash | 242/55.19 |
| 2,778,635 | 1/1957 | Eash | 242/55.19 |
| 2,778,637 | 1/1957 | Eash | 242/55.19 |

*Primary Examiner*—Murray Katz
*Assistant Examiner*—M. R. Lusignan
*Attorney, Agent, or Firm*—Sughrue, Rothwell, Mion, Zinn and Macpeak

[57] ABSTRACT

A tape guide sheet for a magnetic tape recording cassette, said sheet comprising a support sheet of a plastic material or paper, one surface of said sheet having a layer containing a powder or graphite, molybdenum bisulphide or tungsten bisulphide, the opposite surface of said sheet having a layer of aluminum.

13 Claims, 1 Drawing Figure

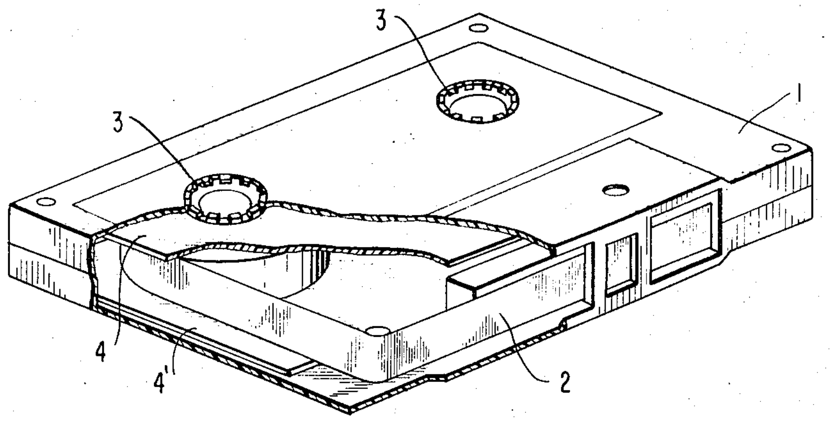
INVENTORS
GORO AKASHI
TAKASHI HIRAKAWA
BY Sughrue, Rothwell, Mion, Zinn & Macpeak
ATTORNEYS

FRICTION SHEET FOR A MAGNETIC TAPE RECORDING CASSETTE

BACKGROUND OF THE INVENTION

1. Field of the Invention

This invention relates to a friction sheet for incorporation in a magnetic recording tape cassette and a magnetic recording tape cassette incorporating such a sheet.

2. Description of the Prior Art

Magnetic recording tape usually comprises a film base of cellulose diacetate, cellulose triacetate, polyethylene terephthalate, polyvinyl chloride or a non-magnetic metal, an undercoating layer deposited on one side thereof and a layer of magnetic recording material deposited on the undercoating layer. The mangetic recording material is usually $\gamma$-ferric oxide particles dispersed in a binder medium in a proportion of about 70 to 80 percent by weight of the magnetic recording layer. $\gamma$-ferric oxide has a hardness on the Moh scale of up to 5. In view of this and in view of the fact that $\gamma$-ferric oxide having a hardness on the Moh scale of 5 – 5.5 is utilized as an abrasive powder (rouge) and has a chemical structure similar to that of $\gamma$-ferric oxide, the magnetic layer of magnetic recording tape may be considered to be an abrasive material.

In the furture it is envisaged that $\gamma$-ferric oxide will be replaced in the magnetic layer by a material such as an alloy or iron and cobalt, cobalt and nickel, or iron, cobalt and nickel which may be deposited on the tape as a film. Such an alloy is very hard and thus will also be abrasive.

During transport of magnetic recording tape in a tape recorder, the tape is usually caused to slide on the surface of a guide pin in the tape recorder, or, when the tape is provided in a tape cassette, as has become popular in recent years, the tape also slides on the inner wall of the cassette. The guide pin or the cassette wall is thus subjected to abrasion. This abrasion is greatly increased when the magnetic tape is run quickly or is rewound, since in this case the tape speed may be 30 times higher than the speed of recording or reproduction. The guide pin or the cassette can thus become severely damaged.

This will be illustrated further with reference to the accompanying drawing, the single FIGURE of which is a diagrammatic perspective view, partly in section, of a magnetic recording tape cassette of the general type standardized by N.V. Philip Gloeilampen Frabriken.

Referring to the drawing, the cassette comprises a casing 1, two tape-winding spools 3,3' positioned within the casing, magnetic recording tape 2 wound on the spools and capable of being wound from one spool to the other, and two planar parallel flexible tape guide sheets 4,4' positioned on opposite sides of the path of the tape, and serving to guide the edges of the tape as in the case of the flanges of a conventional tape spool. Thus, the sheets 4, 4' keep the tape in a constant orientation during the operations of recording, playback, winding, and rewinding.

Because the edges of the magnetic recording tape are not as smooth as the face of the tape and because of the abrasive nature of the magnetic layer as referred to above, if the guide sheets 4,4' of a magnetic recording tape cassette were not provided, the cassette itself would be subjected to severe abrasion during the operations of recording, playback, winding and rewinding, and also the frictional resistance upon the tape would be unduly high. In order to combat this, the guide sheets are provided, and have hitherto consisted of polytetrafluoroethylene (PTFE) sheets, such as, for example, "Teflon" (Registered Trade Mark) which has a low friction coefficient.

It has been found, however, that, after 200 to 300 recording runs, the surface of the PTFE sheet becomes very rough and running of the tape becomes impossible. This is thought to be due to the high surface resistivity of the PTFE sheet (of the order of $10^{15}\Omega$) and it has been proposed to incorporate in the PTFE sheet a carbonaceous material to thereby reduce the resistivity of the sheet. Production of such a sheet, however, is difficult and very expensive.

SUMMARY OF THE INVENTION

According to the present invention, there is provided a friction sheet for a magnetic tape recording cassette comprising a support sheet of plastic material or paper having applied to one surface thereof a layer containing powder of graphite, molybdenum bisulphide or tungsten bisulphide in a suitable binder and, having applied to the opposite surface thereof, a layer of aluminum, copper or carbon in the form of a graphite allotrope thereof or in an amorphous form thereof.

BRIEF DESCRIPTION OF THE DRAWING

The FIGURE represents a conventional magnetic recording tape cassette.

DETAILED DESCRIPTION OF THE PREFERRED EMBODIMENTS

A support sheet, if made of plastic material, may be produced from film forming plastics such as, for example, polyethylene, polypropylene, polystyrene, polyvinyl chloride, polycarbonate, polyethylene terephthalate, cellulose biacetate, or cellulose triacetate which, if necessary, may contain additives such as a pigment, a plasticizer or a lubricant, to facilitate forming. The plastic sheet is preferably sufficiently thick so that it does not wrinkle when cut to the desired size and shape.

Preferably, the maximum particle size of the graphite, molybdenum bisulphide, or tungsten bisulphide powder applied to the first surface of the support sheet is less than about 10 microns and it is preferred that the powder applied to said surface be dispersed in a solution of one or more resins such as a vinyl chloride-vinyl acetate copolymer, an epoxy resin, a vinyl acetate resin, a polyurethane, a styrene-butadiene copolymer, nitro cellulose, a nylon resin, or an acrylic resin.

The amount and type of binder for the powder may vary as is clear to one of ordinary skill in the art, depending upon the desired results. Generally, however, the amount of binder varies from 10 to 50 parts, by weight, based on the weight of 100 parts of powder.

The aluminum or copper layer should have a thickness of greater than 0.005 micron and the carbon layer should have a thickness of greater than 0.1 micron; that is, so the surface electrical resistance is less than $10^8\Omega$-cm/cm.

If amorphous carbon is to be applied to the other surface of the support sheet, then it is preferred to apply it thereto in a similar manner to the foregoing, the carbon preferably being in the form of carbon black powder.

The several embodiments of the present invention will be described further with reference to the following illustrative examples.

CONTROL EXAMPLE

To one face of a polyethylene terephthalate sheet of 12 microns thickness there was firstly applied an undercoating layer having a dry thickness of about 0.5 micron and thereafter there was applied to the undercoating layer a coating liquid consisting of a dispersion in a liquid binder of acicular $\gamma$-ferric oxide particles of a mean longitudinal size of about 0.6 micron in a proportion of 71 percent by weight of liquid. The coating was then dried to form a layer of about 6.5 microns in thickness. The coated film was cut into strips 3.81 mm wide and 90 cm in length, and a length of the tape so formed was loaded into a "Philips"-type "compact cassette" provided with tape guide sheets of flexible Teflon (Registered Trade Mark) of 50 microns thickness. The cassette was then placed in a cassette-type magnetic tape recorder, and was subjected to repeated high-speed tape winding and rewinding operations. The tape velocity was initially such that 90 cm (the whole length of the tape) was wound or rewound in 70 seconds.

The failure point of the Teflon (Registered Trade Mark) was considered to be the winding run during which the tape would no longer move or when the time for the winding of the whole length of tape exceeded 180 seconds.

After 346 runs, the time for a high speed wind exceeded 180 seconds, and the tape would not run after 370 runs. Inspection of the guide sheets at this point showed them to be badly damaged and thus the life of the cassette was considered to be 370 runs.

EXAMPLE 1

A Philips-type cassette was provided with tape guide sheets constructed as follows. To one surface of a polyethylene terephthalate base film there was applied a coating (thickness = 5$\mu$) consisting of 300 parts of graphite powder of mean grain diameter about 5 microns, 150 parts of a vinyl chloride-vinyl acetate copolymer and 500 parts of butyl acetate; and onto the other surface thereof there was electrolytically deposited an aluminum layer (thickness: 0.002 $\mu$). The graphite layer had a very low friction coefficient and electrical resistance while the aluminum layer lowered the resistivity of the support sheet surface. The cassette and the magnetic tape therein were otherwise as described in the Control Example. The useful life test was carried out as described in the case of the Control Example, and 1,000 runs were achieved within the allowed limits.

EXAMPLE 2

A Philips-type cassette was provided with tape guide sheets constructed as follows. To both surfaces of a support sheet of art paper there was applied a graphite containing coating (thickness: 0.6$\mu$) of the same composition as that of Example 1. The magnetic tape and the cassette were otherwise as described in the Control Example. A useful life test was conducted as in the Control Example and 800 runs were achieved within the allowed limits.

Not only was the resistivity of this sample favorable, but, because both coatings were the same, either face could be used for contact with the tape without distinction, and the sheet was balanced against the tendency to curl with changes of temperature or moisture.

EXAMPLE 3

A Philips-type cassette was provided with tape guide sheets constructed as in Example 1 except that the graphite coating of Example 1 was replaced by a molybdenum bisulphide coating (thickness: 2$\mu$). As in Example 1, the other surface was provided with an electrolytically deposited aluminum layer. The magnetic tape and the cassette were otherwise as described in the Control Example. In a useful life test conducted as in the Control Example over 800 runs were achieved within the allowed limits.

EXAMPLE 4

A Philips-type cassette was provided with tape guide sheets constructed as in Example 2 except that one of the graphite coating layers of the sheets of Example 2 was replaced by a coating layer of tungsten bisulphide (thickness: 0.6$\mu$). The magnetic tape and the cassette were otherwise as described in the Control Example. In a useful life test conducted as in the Control Example over 1,200 runs were achieved within the allowed limits.

What is claimed is:

1. A tape guide sheet for a magnetic tape recording cassette, said sheet comprising a support sheet of a plastic material or paper, one surface of said sheet having a first layer containing a powder of graphite, molybdenum bisulphide or tungsten bisulphide, the opposite surface of said sheet having a second layer of aluminum.

2. A tape guide sheet as in claim 1, wherein said support sheet comprises polyethylene, polypropylene, polystyrene, polyvinyl chloride, polycarbonate, polyethylene terephthalate, cellulose biacetate, or cellulose triacetate.

3. A tape guide sheet as in claim 1 wherein said powder has a particle size of less than 10 microns.

4. A tape guide sheet as in claim 1 wherein the first layer containing said powder comprises a dispersion of said powder in a resinous binding medium.

5. A tape guide sheet as in claim 1 wherein said second layer of aluminum comprises electrolytically-deposited aluminum.

6. A tape guide sheet as in claim 1 wherein said second layer has a thickness such that its surface electrical resistance is less than $10^8$ ohm-cm./cm.

7. A tape guide sheet as in claim 4 wherein said resinous binding medium is selected from the group consisting of a vinyl chloride-vinyl acetate copolymer, an epoxy resin, a vinyl acetate resin, a polyurethane, a styrene-butadiene copolymer, nitro-cellulose, a nylon resin, an acrylic resin and mixtures thereof.

8. A tape guide sheet as in claim 4 wherein said binder is present in an amount of from 10 to 50 parts by weight, per 100 parts by weight of said powder.

9. A tape guide sheet as in claim 6 wherein said second layer of aluminum has a thickness greater than 0.005 micron.

10. A tape guide sheet for use in a magnetic tape recording cassette comprising a support;

a first layer on one side of said support consisting essentially of a powder of a graphite, molybdenum bisulphide or tungsten bisulphide dispersed in a synthetic resin binder; and a second layer on the other side of said support consisting essentially of aluminum.

11. A tape guide sheet as in claim 10 wherein said powder in said first layer has a particle size of less than about 10 microns.

12. A tape guide sheet as in claim 10 wherein said second layer has a thickness such that its surface electrical resistance is less than $10^8$ ohm-cm/cm.

13. A tape guide sheet as in claim 10 wherein said first layer comprises the layer which faces the tape when said tape guide sheet is placed in said magnetic tape recording cassette.

* * * * *